Oct. 14, 1958 R. O. SHEPP 2,856,453
PORTABLE CONTROL CABLE WITH CREPE PAPER SEPARATOR
Filed May 25, 1954
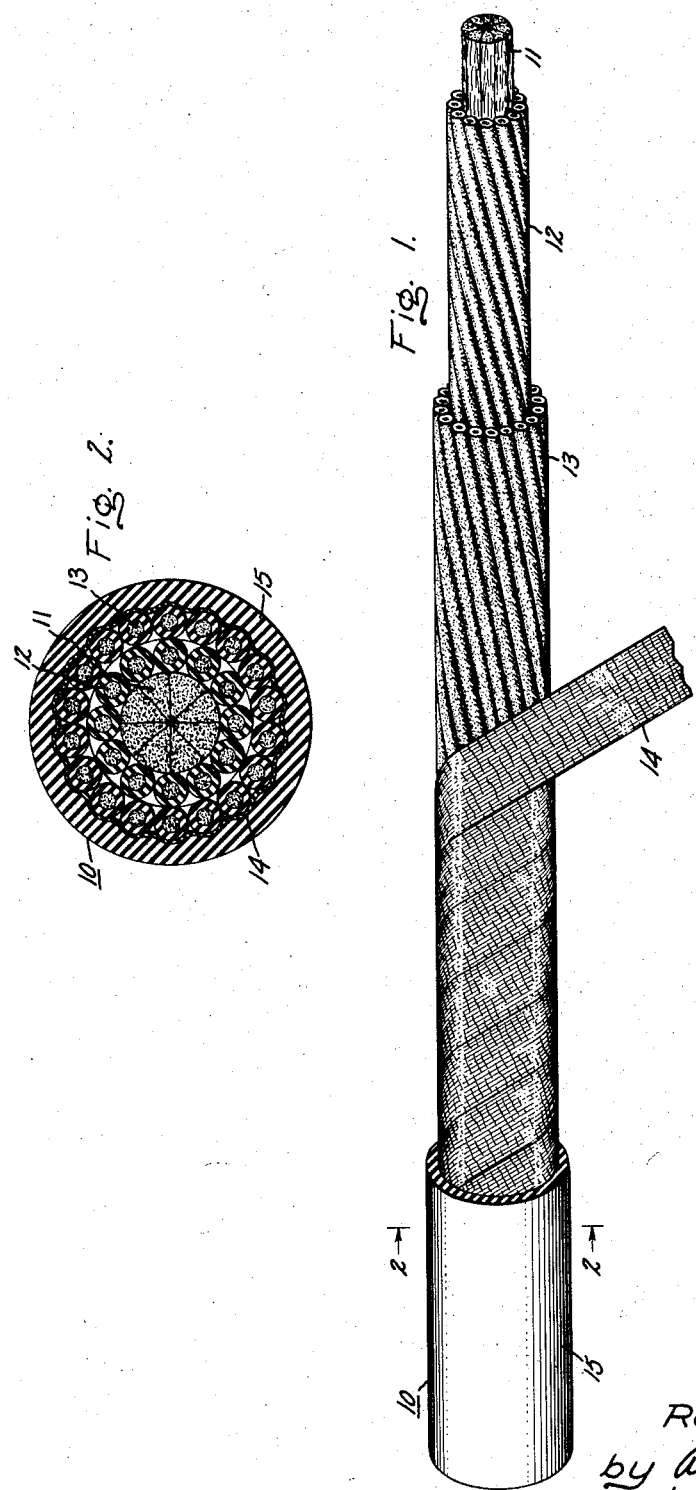
Inventor:
Robert O. Shepp,
by Allard A. Braddock
His Attorney.

United States Patent Office 2,856,453
Patented Oct. 14, 1958

2,856,453

PORTABLE CONTROL CABLE WITH CREPE PAPER SEPARATOR

Robert O. Shepp, San Leandro, Calif., assignor to General Electric Company, a corporation of New York Application May 25, 1954, Serial No. 432,151

2 Claims. (Cl. 174—116)

This invention relates to a portable multiconductor control cable, and particularly, to a combination crepe paper binder and separator for such a cable.

In certain applications where portable control cables are used, it is desirable to have cable capable of withstanding extreme bending and torsional stresses. Such cable would, for instance, be found suspended from overhead cranes or hoists so that an operator at floor level could maneuver the crane or hoist with a push-button control box hanging from the cable. Rotating gun turrets, radar equipment and other portable apparatus which are provided with dangling control cables also put severe strains on these cables which greatly shorten the useful life of such cables.

Normally, a multi-conductor control cable is made by twisting the insulated conductors together to form a plurality of layers at which time it is necessary to apply a binder in order to hold the conductors assembled as they leave the stranding machine. Usually this binder consists of an open spiral of cotton thread wound over the top layer of conductors. Before the insulating jacket of thermoplastic or thermosetting material is applied to the cable, a loose cotton braid is first formed over the conductors to act as a separator for the jacket to prevent the jacket material from completely filling the interstices between the conductors of the outer layer. The separator also prevents the jacket from adhering to the conductors so that slippage is provided for the conductors relative to themselves and the jacket.

Eventually, such cables fail due to broken conductors and the breaks are generally due to the kinking of the conductors caused by the repeated twisting of the cable while in service. Seldom is the failure due to a straight bending action. It has been found that the kinking and the eventual failure of the conductors is caused primarily by the restrictive action of the cotton thread binder which concentrates the stresses at spaced points along the cable when the outer layer of conductors attempts to "birdcage" (open up) upon the twisting of the cable.

Unfortunately, the thread binder cannot be eliminated because it is not possible to apply the braided covering at the same time as the cable is "closed," therefore something must be used to hold the conductors together after they are helically wound on a stranding machine, and until a braided covering can be applied in a subsequent operation.

On portable power cables having only two, three, or four conductors of a much larger size than are found in control cable, it is possible to combine the binder and separator into the form of a conventional cable tape such as a cotton cloth having rubber calendered on one side. However, such a tape cannot be used to bind a multiplicity of small conductors for the simple reason that it would stiffen the assembly to the point where it would be useless for many important applications.

It is an object of this invention to provide a portable multi-conductor control cable with a combined binder and separator in the form of a two-way stretch crepe paper which will enable the cable conductors to withstand both bending and torsional forces.

A further object of this invention is to provide a two-way stretch crepe paper separator which will prevent the jacket material from being forced completely into the interstices of the conductors and thereby prevent the conductors from being locked in place.

A further object is to permit a certain amount of relative slippage between the conductors and the jacket which contributes to the flexibility of the cable.

A furtther object of primary importance is to provide a control cable with a single binder and separator of two-way stretch crepe paper which will present a uniform resistance to the opening of the cable as it is twisted.

My invention will be better understood from the following description taken in connection with the accompanying drawing and its scope will be pointed out in the appended claims.

In the drawing:

Fig. 1 represents a portion of a portable multi-conductor control cable incorporating a combined binder and separator made of a two-way stretch crepe paper.

Fig. 2 is an enlarged cross-sectional view of the cable in Fig. 1 taken along the lines 2—2 of Fig. 1.

Referring now to the drawing, there is shown in Fig. 1 a cable 10 constructed with a central core 11 of jute or other fibrous material having wound thereon an inner layer 12 and an outer layer 13 of insulated conductors. As is the usual practice, these conductors are insulated with a suitable material and further covered with an outer fabric material of different colors for coding purposes. Greater flexibility is provided by cabling the conductors "uni-lay," that is, all in the same direction and by maintaining the proper pitch ratios between the various layers.

While the conductors are being formed around the jute core 11 by the stranding machine into the layers 12 and 13, a combined binder and separator in the form of a special tape is wound in the opposite direction to the direction of twist of the conductors. This tape 14 is wound with a slight overlap of about ⅛" to ¼" depending on the size of the cable. This combined binder and separator tape 14 is made from a two-way stretch crepe paper similar to that which was used as the insulation in the Camilli et al. Patent No. 2,607,824, which is assigned to the same assignee as is the present invention. In accordance with the present invention, the crepe paper which is used has two crepings which are substantially perpendicular to each other, one creping extending longitudinally of the tape while the second creping extends transversely of the tape.

While I have illustrated an embodiment of this invention in which the mutually perpendicular crepe lines of the two-way stretch crepe paper are arranged longitudinally and transversely of the tape, it is obvious that the position of the crepe lines may be shifted with respect to the axis of the tape without departing from the scope of this invention. For example, the mutually perpendicular crepe lines may be arranged at an angle of 45° with respect to the longitudinal axis of the crepe paper tape.

After the application of the combined binder and separator of two-way stretch crepe paper, an outer jacket 15 of rubber, neoprene, or equivalent thermoplastic or thermosetting insulating material is extruded, molded or otherwise formed over the assemblage. Finally, the jacket is vulcanized if it is of thermosetting material. The vulcanizing step develops a pressure which forces the jacket material inwardly against the crepe paper separator. The two-way stretch crepe paper has enough body or strength to limit the amount of the jacket material which will be forced into the interstices of the insulated conductors of the outer layer 13. The jacket material 15 will adhere to the crepe paper tape 14 but the tape 14 is in no way bonded to the insulated conductors of the layer 13. Therefore, slippage is provided for the insulated conductors within the cable jacket during both the bending and the twisting of the cable which fact enhances the flexibility of the cable.

It is an important feature of this invention that the crepe paper prevents the jacket material from completely filling the interstices between the conductors of the layer 13, for this would destroy the freedom of movement between the core of taped conductors and the jacket. If necessary, fiber fillers would be used in the interstices of the outer layer 13, as in a cable having only a few large conductors. In a multi-conductor cable having a considerable number of conductors this is not necessary because the interstices are relatively small.

Experience has taught the importance of using a two-way stretch crepe paper in preference to the usual one-way stretch crepe paper commonly used by the industry for many other cable applications.

I have used the two-way stretch crepe paper to overcome the localization of stresses caused by the open spiral binder. This paper permits the conductors to expand evenly when subjected to a twisting action, and so dissipate the stresses by shifting the angle of lay of the different layers of conductors. A one-way crepe paper will not result in a superior flexible cable because it is flexible in only one direction. If the conventional one-way crepe paper were used as a substitute for the combined binder and separator 14 of this invention, the crepe paper would crack if a bend were placed in the cable due to the limited elongation of the one-way crepe paper. To eliminate this, the one-way crepe paper could be of heavy stock, but if it is heavy enough to resist tearing or cracking due to bending, it will also stiffen the cable to an undesirable degree which will render it inoperative for many important applications. My invention incorporates a high quality paper having a two-way stretch crepe. This allows for the stretching of the tape so that the core of conductors has freedom of movement during both the bending and the twisting of the cable.

Modifications of this invention will occur to those skilled in this art, and it is to be understood, therefore, that this invention is not limited to the particular embodiment disclosed, but that it is intended to cover all modifications which are within the true spirit and scope of this invention.

What I claim as new and desire to secure by Letters Patent of the United States is:

1. A portable control cable comprising a plurality of layers of helically wound insulated conductors where each layer is wound in the same direction but with a different pitch ratio than another layer, a layer of spirally-wound crepe paper tape applied over said layers of conductors but in the opposite direction from the conductors to act as a combined binder and separator, and an outer elastomeric insulating jacket surrounding said tape, said crepe paper tape having two crepings substantially perpendicular to each other so that the tape is capable of stretching in all directions to furnish a uniform resistance to the opening of the conductors when the cable is twisted.

2. A portable control cable comprising a central core of fibrous filler material and a plurality of layers of concentric-lay insulated conductors cabled over said core each layer being wound in the same direction and having dissimilar pitch ratios, a single layer of spirally-wound crepe paper tape applied over said conductors as a combined binder and separator, and an outer thermoplastic insulating jacket surrounding said taped conductors, said crepe paper tape having two crepings substantially perpendicular to each other so that the tape is capable of stretching in all directions to furnish a uniform resistance to the opening of the conductors when the cable is twisted.

References Cited in the file of this patent
UNITED STATES PATENTS

| | | |
|---|---|---|
| 327,493 | Spalding | Sept. 29, 1885 |
| 398,441 | Patterson | Feb. 26, 1889 |
| 475,920 | Bassett | May 31, 1892 |
| 1,905,789 | Benner et al. | Apr. 25, 1933 |
| 2,222,638 | Szilard | Nov. 26, 1940 |
| 2,589,507 | Noyes | Mar. 18, 1952 |
| 2,607,824 | Camilli et al. | Aug. 19, 1952 |